United States Patent Office 2,889,884
Patented June 9, 1959

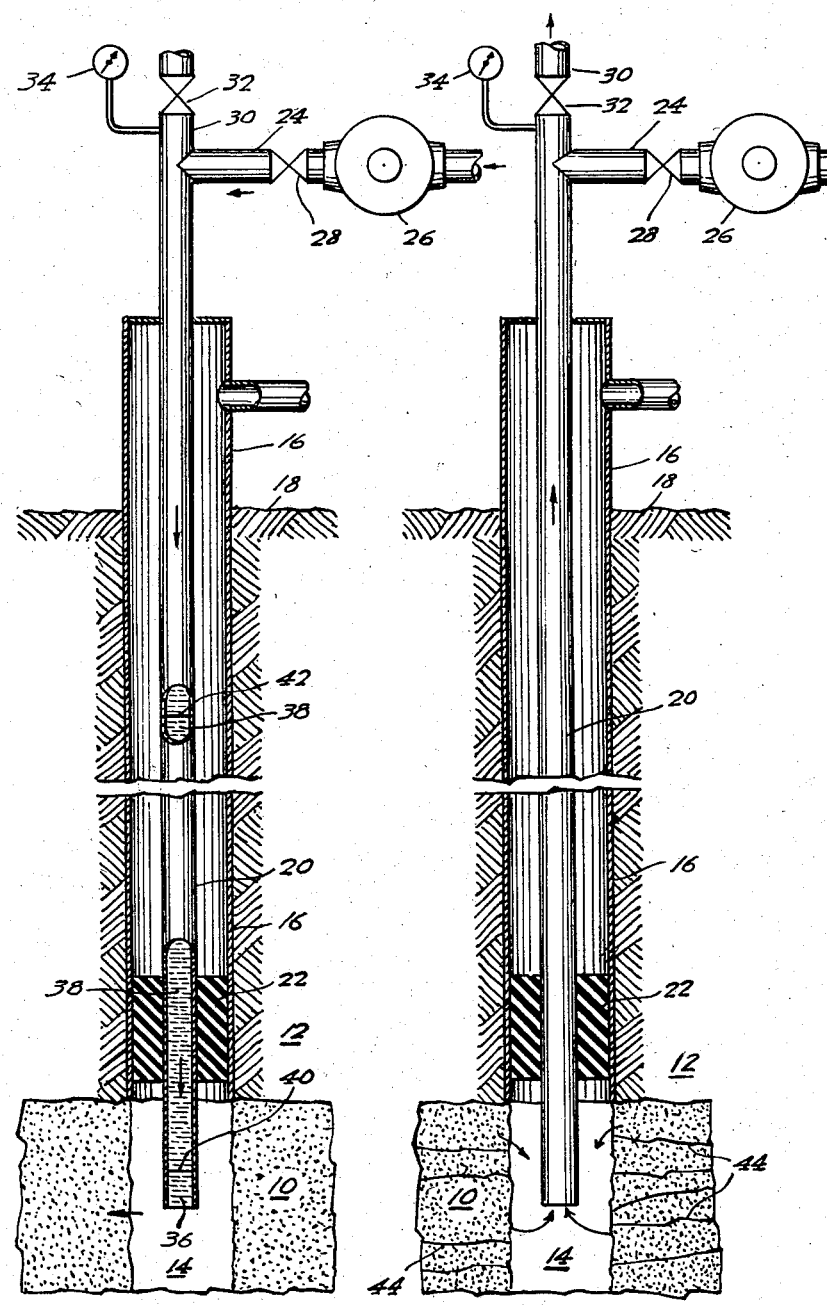

2,889,884

PROCESS FOR INCREASING PERMEABILITY OF OIL BEARING FORMATION

James H. Henderson, Pine Township, Allegheny County, and Joseph J. Taber, Dorseyville, Pa., assignors to Gulf Research & Development Company, Pittsburgh, Pa., a corporation of Delaware Application October 12, 1956, Serial No. 615,530

14 Claims. (Cl. 166—38)

This invention relates to a method of increasing the permeability of a subterranean formation, and is especially adapted for treating subterranean producing formations penetrated by a well to reduce the resistance to flow and to open passages in the formation to facilitate flow of fluids. This invention is of principal utility in oil producing formations to remove water blocking the flow of oil through the formation to a well.

Oil producing formations in addition to being porous to permit the storage of oil must be permeable to permit flow of oil through the formation to the well. The pores of the permeable producing formations are connected by extremely small tortuous passages, which are easily blocked by the precipitation of paraffin therein or by water invasion, thereby greatly reducing the rate at which fluids can be produced from the formation. Blocking of the permeable formation is especially serious close to the wall of the well from which production is delivered because the total cross section area of passages through which liquids must flow from the formation to the well is aproximately proportional to the distance from the well.

Many oil producing formations have water underlying oil in the formation and are produced by a water drive which maintains sufficient pressure to force the oil into wells drilled into the formation. During production water may "cone" around the well and prevent production of oil from the well. In addition to coning, other sources of blocking water can be drilling mud filtrate invasion, invasion during workovers and invasion from any other water bearing strata open to the producing formation. Often the permeable producing formations contain water in small discrete droplets in the pores or connecting passages. This water, which is substantially immobile and cannot be displaced under normal operating conditions by an immiscible liquid flowing through the formation, has the effect of reducing the size of the passages and thus interferes with flow of oil from the well.

This invention resides in a method of increasing the permeability of a producing formation surrounding a well by forcing into the formation to be treated solutions of metal hydrides which react with water in the formation, consume the water and produce heat and a large volume of gas to place the formation under a high pressure. When the producing formation is a consolidated formation, the high pressure developed in the formation fractures the formation, thereby increasing its permeability. The pressure is rapidly released to cause the gas to blow out of the formation into the well and sweep plugging materials from the formation.

In the drawings:

Figure 1 is a diagrammatic illustration of a well treated by the process of this invention during the stage of the process in which the liquid solution is being pumped into a consolidated producing formation.

Figure 2 illustrates the formation during release of pressure and discharge of the gases from the formation and the well.

This invention is especially useful in treating oil wells to remove water blocks from the oil producing formation, which blocks interfere with production from the well. Because of the fracturing that occurs in the treatment of consolidated formations, the process is also useful in treating other wells such as salt water disposal wells, water injection wells, and wells used in solution ore extraction such as salt wells, sulfur wells and uranium wells, where a passage allowing circulation of a liquid is required.

It is essential to the process of this invention that the reagent which reacts with water to form large quantities of gas and release large quantities of heat be capable of being pumped into the formation to react with water in the formation. Reaction of the reagent and water in the well bore is prevented by protecting the reagent from contact with water as it is pumped down to the producing formation. The necessary protection can be obtained by pumping a slug of dehydrated hydrocarbon oil such as diesel oil, crude oil, or kerosene, down the well ahead of the reactant to displace water from the well bore.

The amount of reagent employed is preferably the stoichiometric equivalent or more of the water in the portion of the formation which it is desired to treat. It is desirable to avoid having any aqueous phase in the portion of the formation treated after the reaction. Because the flow from a producing formation is generally limited by the restriction in total cross section area of passages immediately surrounding the borehole of the well, it is not necessary to remove water and treat the formation for substantial distances from the well. Ordinarily, treatment of the formation for a distance of 10 feet or less from the borehole wall is sufficient for most purposes.

The reaction of the reagents used in this invention with water releases an extremely large amount of heat and hydrogen and hence, develops high temperatures and pressures in the formation. The violence of the treatment can be controlled by the concentration of the reagent in the solution pumped into the formation and the rate of pumping. The reaction of the reagents and the water is so rapid and complete that the pressure developed cannot be released through the normal passages in the formation, with the result that extensive fracturing of consolidated formations occurs. In some instances it may be desirable to suspend a propping agent, such as graded sand, in the reagent. The propping agent will enter the fractures formed in the formation and hold them open upon subsequent release of the pressure.

Alkaline material formed by reaction of the reagents with water will, if left in contact with the formation, impair its structure and may decrease its permeability. For this reason the pressure on the formation is relieved by blowing back through the well promptly after the reagent has been pumped into the formation. The release of the pressure causes the gas in the formation to scavenge uncemented solid particles from the formation and scour the borehole wall. The high velocity of the gas discharged from the formation and the resultant high pressure drop from the formation to the borehole will sweep any water in the formation which may not have reacted with the hydride from the formation into the borehole and out of the well.

The reagents used in this invention are the hydrides of alkali and alkaline earth metals, complex hydrides of alkali metals and aluminum or boron, and mixtures thereof. Suitable primary metallic hydrides are, for example, lithium hydride, sodium hydride, calcium hydride, strontium hydride, and potassium hydride. Examples of complex metal hydrides which can be used in this invention are lithium aluminum hydride, sodium aluminum hydride, lithium boron hydride, sodium boron hydride, and potassium boron hydride. Lithium aluminum hydride has the advantage of having a high solubility in solvents which can be used in this invention. Lithium boron hydride releases the greatest quantity of hydrogen per unit weight of the reagent.

An example of the reaction that takes place in the formation is the following reaction of lithium aluminum hydride with water:

$$LiAlH_4 + 2H_2O \rightarrow LiAlO_2 + 4H_2$$

This reaction will liberate 5,332 B.t.u. per pound of lithium aluminum hydride and 38.0 cubic feet of hydrogen at one atmosphere pressure and 32° F. It will be noticed that each mol of water in the formation will, upon reacting with the hydride, result in the release of two mols of hydrogen.

The metal hydrides must be in solution in order that they may be forced into the permeable formation. An important advantage of the metallic hydrides is that they can be dissolved in non-aqueous solvents inert to the hydrides to form solutions which can be readily pumped into the formation. Suitable solvents are, for example, diethylether, tetrahydrofurane, dimethyl Cellosolve, and dibutylether. The particular solvent used is not critical, as long as it permits solutions of high enough concentration of the metal hydride to react with all of the water in the formation treated. In some instances it is desirable to use a solvent for the metal hydrides which is also soluble in water in order to facilitate contact of the hydride with water in the formation. Dioxane is a suitable water soluble solvent for the metal hydrides. Diethylether also has an appreciable solubility in water. The violence of the treatment can be controlled by adjustment of the concentration of the solution and thereby controlling the rate at which the metal hydride is mixed with the water.

Referring to the drawings, a well is diagrammatically illustrated for production through an open hole in the producing formation. This invention can also be used when the well is cased through the producing formation and the casing perforated in the conventional manner. The producing formation indicated by reference numeral 10, is covered by an impermeable formation 12. Both the impermeable formation 12 and producing formation 10 are penetrated by a borehole which opens at 14 in the producing formation.

A casing 16 extends upwardly through the impermeable formation 12 to the ground surface 18. Casing 16 is cemented in the usual manner and ordinarily will be enclosed at its upper end in conductor and surface casing, not shown in the drawings.

Extending down through the casing 16 to the open borehole 14 is a tubing 20. The annular space surrounding the tubing 20 is closed by a packer 22 which is seated at the lower end of the casing to protect the casing from the high pressures that are developed. Tubing 20 extends upwardly past the upper end of casing 16 and is connected with a line 24 for delivery of the reagent into the well. A pump 26 and a valve 28 are connected in line 24 to supply pressure for, and to control the flow of reagent into, the tubing 20. Connected to the upper end of tubing 20 is an outlet line 30 having a valve 32 which allows control of the rate of exhaust of the gases from the formation. For convenience, a pressure gauge 34 is connected into outlet line 30 below the valve 32.

In the operation of the apparatus illustrated in the drawings according to this invention a slug of an inert liquid such as crude oil or diesel oil, indicated by reference numeral 36 is delivered by pump 26 through line 24 down through tubing 20 to displace up past the unseated packer 22 and into the casing annulus 17 any water that may be present in the tubing and the borehole. The diesel oil 36 is followed by a measured amount of a solution of metal hydride 38 calculated to react with the water in the volume of the permeable formation to be treated around the borehole 14. The interface between the hydrocarbon oil and the metal hydride solution is indicated by reference numeral 40 and the upper level of the metal hydride solution is indicated by reference numeral 42. Another slug of inert liquid is pumped into the tubing 20 following the metal hydride solution to force the metal hydride solution into the formation.

Before the metal hydride solution enters the formation and reacts with the water present the packer 22 is seated. When the metal hydride enters the formation and reacts with the water, large quantities of hydrogen are released in the formation causing the pressure in the borehole 14 and the tubing 20 to rise sharply. In instances where water of crystallization is present in the formation, the heat produced by this reaction will decompose the formation sufficiently to furnish additional water for reaction with fresh hydride and increase the porosity and permeability of the formation. The increase in pressure is indicated by the pressure gauge 34. Operation of the pump 26 is continued until all of the metal hydride solution has been forced into the formation. It is desirable to continue pumping a slug of inert material following the metal hydride solution until the last of the metal hydride solution has been forced into the outer portion of the formation treated, thereby insuring contact of all of the water in the portion of the formation to be treated with unreacted metal hydride. The rate of pumping of the liquid will control to some extent the pressure developed in the formation by determining the rate at which the hydrogen is liberated. Since the rate of reaction of the metal hydride and water is so rapid that the hydrogen cannot escape into the formation at the rate it is liberated, very high pressures are developed to form fractures 44 in the formation.

A relatively short time after the metal hydride solution has been pumped into the formation the valve 32 is opened and the valve 28 is closed to allow the gases in the formation to blow back to the borehole 14 and out through the tubing 20. The time between completion of the pumping of the metal hydride solution into the formation and the release of the pressure to cause blowing back of the hydrogen produced by the reaction is preferably the shortest time that will allow a substantially complete consumption of water within the radial distance in the formation to be treated by the metal hydride. Since the reaction between metal hydride and water is substantially instantaneous, the time required for removal of the water is primarily determined by the time required for bringing the metal hydride into contact with the water. It is desirable not to delay the blow back of the gases developed sufficiently long that there will be an appreciable decrease from the maximum pressure exerted on the formation.

The large amount of hydrogen developed and the high pressures exerted on the formation by the process of this invention gives considerable flexibility in the time required for dissipaton of the pressure and hence the time available for release of the pressure at the well head. The rate of dissipation of pressure through the formation will be dependent upon several variables such as the permeability of the formation, the viscosity of oil in the formation and the radial distance around the well which is to be treated. The rate of pressure dissipation increases with an increase in permeability of the formation and decreases with an increase in the viscosity of the oil in the formation, since pressure dissipation occurs principally by forcing oil farther back into the formation. The amount of water consumed by the metal hydride and hence the amount of hydrogen liberated is approximately proportional to the square of the radial distance treated. Thus, an increase in the radial distance treated causes an increase in the time available before there is substantial dissipation of the pressure. Approximate relationships between formation permeability and radial distances treated for a decrease in pressure of 1,000 pounds per square inch if the oil in the formation has a viscosity of one centipoise are illustrated in Table I.

Table I

[Time required for decrease in pressure, minutes.]

| Effective Oil Permeability (Millidarcys) | Radial Distance Treated=1 ft. | Radial Distance Treated=10 ft. |
|---|---|---|
| 1,000 md | 0.011 | 0.55 |
| 100 md | 0.11 | 5.5 |
| 10 md | 1.1 | 55 |
| 1 md | 11.0 | 550 |

The period between completion of pumping the metal hydride solution into the formation and release of the pressure on the formation can be any period up to about 10 hours. In most instances the release of pressure on the well to cause blowing back of hydrogen through the formation and scavenging materials therefrom, should be not more than about 5 hours after completion of pumping into the formation. There is no particular advantage in leaving the hydrogen in the formation after reaction of the metal hydride with the water in the formation is completed and it is preferred that the release of pressure be effected when, or soon after, the maximum pressure on the formation has been reached. Ordinarily the release of pressure will be within a few minutes, for example 10 minutes or less after the pumping of the metal hydride has been completed. Pressure gauge 34 provides an excellent means for determining the optimum time for releasing the pressure. When the pressure gauge 34 indicates that the pressure on the formation has reached a maximum the valve 32 is opened to release the pressure. Ordinarily the pressure will be released within a few minues, for example 10 minutes or less, after completion of the pumping of the metal hydride solution into the formation.

In a specific example of this invention, a well having a borehole diameter of 6 inches is drilled through a sand 12 feet thick having a fractional porosity of 0.2, a fractional water saturation of 0.1, a grain density of 2.65 and a specific heat of 0.25 B.t.u./lb./° F. 11.3 cubic feet of a solution of lithium aluminum hydride in diethylether are pumped down the well and into the sand to treat the sand for a distance of 1 foot from the borehole. The solution contains 0.175 mol of lithium aluminum hydride per cubic foot. The solution of lithium aluminum hydride is followed by a measured amount of diesel oil to force all of the lithium aluminum hydride into the sand. Thirty seconds after all of the lithium aluminum hydride is pumped into the formation the pressure on the well is relieved by opening the upper end of the well and the hydrogen produced by the reaction of the lithium aluminum hydride and water is allowed to blow back through the well.

The reaction of the lithium aluminum hydride and water in the above reaction releases approximately 400,000 B.t.u.'s. Assuming all of the heat evolved is used to heat the sand except 120,000 B.t.u.'s lost as vapor passing beyond the 1.25 foot radius to be treated, the temperature rise is approximately 1465° F. 2,840 standard cubic feet of hydrogen are released by the reaction, which, at the high temperature attained develops a pressure in excess of about 5,000 p.s.i. sufficient to fracture the consolidated formation.

Because of the use of solutions of metal hydride, this invention allows effective quantities of metal hydride to be delivered any desired distance into the formation for reaction with water blocking the formation. Since the principal difficulty with flow is in formations of low permeability, the use of a solution has important advantages over suspensions of solid particles in liquids. Even extremely finely divided particles suspended in liquids, for example, dilute suspensions of bentonite in water are largely filtered at the borehole wall out of liquids forced into permeable formations. Moreover, the metal hydrides produce extremely large quantities of hydrogen and liberate large amounts of heat upon reaction with a given quantity of water. All of the water in the radial distance of the formation treated is consumed by the reaction, thereby making subsequent removal from the formation of aqueous fluids unnecessary.

We claim:

1. A process for increasing the permeability of oil producing formations containing water comprising pumping a solution of a metal hydride into the formation whereby the metal hydride reacts with water in the formation to liberate hydrogen in the formation and generate a high pressure therein, maintaining pressure on the formation while the metal hydride reacts with the water, and releasing the pressure on the formation to discharge hydrogen therefrom at a high velocity and scavenge plugging materials from the formation.

2. A process as set forth in claim 1 in which the amount of metal hydride introduced into the formation is in excess of that required to react with all of the water in the portion of the formation occupied by the solution of metal hydride.

3. A process for treating a well for the production of hydrocarbons from a formation containing water to increase production of hydrocarbons therefrom comprising pumping a solution of a metal hydride down the well and into the formation whereby the metal hydride reacts with water in the formation, maintaining pressure on the well while the metal hydride reacts with water in the formation to develop a high pressure in the formation, and quickly releasing the pressure on the well at approximately the time the maximum pressure on the formation is developed to cause hydrogen liberated in the formation to scavenge plugging materials therefrom.

4. A process as set forth in claim 3 in which a liquid inert to the metal hydride is pumped down the well after the metal hydride solution to displace the metal hydride solution radially from the borehole through the portion of the formation to be treated.

5. A process as set forth in claim 1 in which the metal hydride is lithium aluminum hydride.

6. A process as set forth in claim 1 in which the metal hydride is lithium boron hydride.

7. A process as set forth in claim 1 in which the metal hydride is sodium aluminum hydride.

8. A process as set forth in claim 1 in which the metal hydride is sodium boron hydride.

9. A process as set forth in claim 1 in which the metal hydride is lithium hydride.

10. A process as set forth in claim 3 in which the solution is a solution of lithium aluminum hydride in diethylether.

11. A process as set forth in claim 3 in which the solution is a solution of a metal hydride in a solvent soluble in water.

12. A process as set forth in claim 3 in which the solution is a solution of lithium aluminum hydride in dioxane.

13. A method of removing water from a portion of a permeable water-containing formation surrounding a well and increasing the permeability of the formation comprising injecting a solution of a metal hydride selected from the group consisting of hydrides of alkali metals, hydrides of alkaline earth metals, complex hydrides of alkali metals and aluminum, complex hydrides of alkali metals and boron, and mixtures thereof, into the formation to be treated whereby the metal hydride reacts with water in the formation, the amount of the metal hydride being in excess of the stoichiometric equivalent of the water in the portion of the formation occupied by the solution, maintaining pressure on the well during reaction of the metal hydride in water to develop a high pressure in the formation, and releasing the pressure on the well to remove plugging materials from the formation.

14. A process for increasing the permeability of oil producing formations surrounding a well, said oil producing formations containing water, comprising pumping a solution of a metal hydride containing particles of a propping agent suspended therein down the well, displacing the solution of metal hydride into the formation whereby the metal hydride reacts with water in the formation, applying a pressure on the formation sufficient to fracture the formation, continuing displacement of the solution of metal hydride into the formation to displace propping agent into the fractures formed in the formation, and releasing the pressure on the formation to discharge hydrogen therefrom and scavenge plugging materials from the formation.

References Cited in the file of this patent

UNITED STATES PATENTS

| | | |
|---|---|---|
| 1,351,945 | Dulany | Sept. 7, 1920 |
| 1,806,499 | Ranney | May 19, 1931 |
| 2,672,201 | Lorenz | Mar. 16, 1954 |
| 2,748,867 | Lissant | June 5, 1956 |
| 2,799,342 | Fatt | July 16, 1957 |